United States Patent

Pei

[11] 3,936,288
[45] Feb. 3, 1976

[54] METHOD FOR MAKING A GLASS-CERAMIC RECUPERATOR
[75] Inventor: Yu K. Pei, Toledo, Ohio
[73] Assignee: Owens-Illinois, Inc., Toledo, Ohio
[22] Filed: Dec. 10, 1974
[21] Appl. No.: 531,235

Related U.S. Application Data
[62] Division of Ser. No. 333,402, Feb. 16, 1973.

[52] U.S. Cl. .......................... 65/33; 65/43; 65/156; 156/296
[51] Int. Cl.² .................. C03B 32/00; C03C 27/00
[58] Field of Search ................. 65/33, 43, 156, 152; 156/296, 443; 165/10, 165

[56] References Cited
UNITED STATES PATENTS

| | | | |
|---|---|---|---|
| 3,771,592 | 11/1973 | Sayers | 65/33 X |
| 3,773,484 | 11/1973 | Gray | 65/33 X |
| 3,781,852 | 3/1975 | Pei | 65/33 X |

Primary Examiner—S. Leon Bashore
Assistant Examiner—Frank W. Miga
Attorney, Agent, or Firm—Myron E. Click; E. J. Holler

[57] ABSTRACT

The novel embodiments disclosed herein also illustrate a novel method for making a recuperator structure. First and second pluralities of layers of elongated tubes are provided which are formed of a glass that is thermally crystallizable to a low expansion glass-ceramic. Each of the tubes is filled with a fluid medium that is expansible in response to the application of heat and the tubes have sealed ends to retain the expansible fluid medium entrapped therein. Each of the tubes has an essentially straight central portion and header connector portions continuing from each end of the central tube portions to the sealed end of the tube. The header connector tube portions of the first plurality of layers diverge away from the header connector tube portions of the second plurality of layers at the ends of the central tube portions when the first and second layers are placed on top of each other. The central tube portions of the first and second pluralities of layers are stacked one above the other with the axes thereof all essentially parallel and with the central tube portions of each first plurality layer in heat exchange relationship with the central tube portions of a second plurality layer. The header connector tube portions at each end of the central tube portions of each layer are arranged so that the header connector tube portions of the first layers diverge from the header connector tube portions of the second layers to provide four sets of separated header connector tube portion ends. Each set of header connector tube portion ends on one of the first and second pluralities of layers extend from the stacked array of tubes as a plurality of tube layers spaced apart by the central tube portions of the other of the first and second plurality of layers. The spaces between the layers and around the tubes adjacent the ends thereof of each set of header connector tube portions are filled with a header connecting material that is thermally crystallizable to a low expansion glass-ceramic which has substantially the same coefficient of lineal thermal expansion as the tubes to seal each set against fluid flow between the tubes. The outer surfaces of the assembly of tube layers and header connecting materials are constrained to prevent outward movement of the assembly. The constrained assembly is heat treated to soften the elongated tubes and enable the fluid medium therein to expand and urge the tubes into contact with adjacent tubes and with the header connecting material to fuse the assembly into an integral mass, and to effect crystallization of the tubes and the header connecting material into a low expansion glass-ceramic.

17 Claims, 19 Drawing Figures

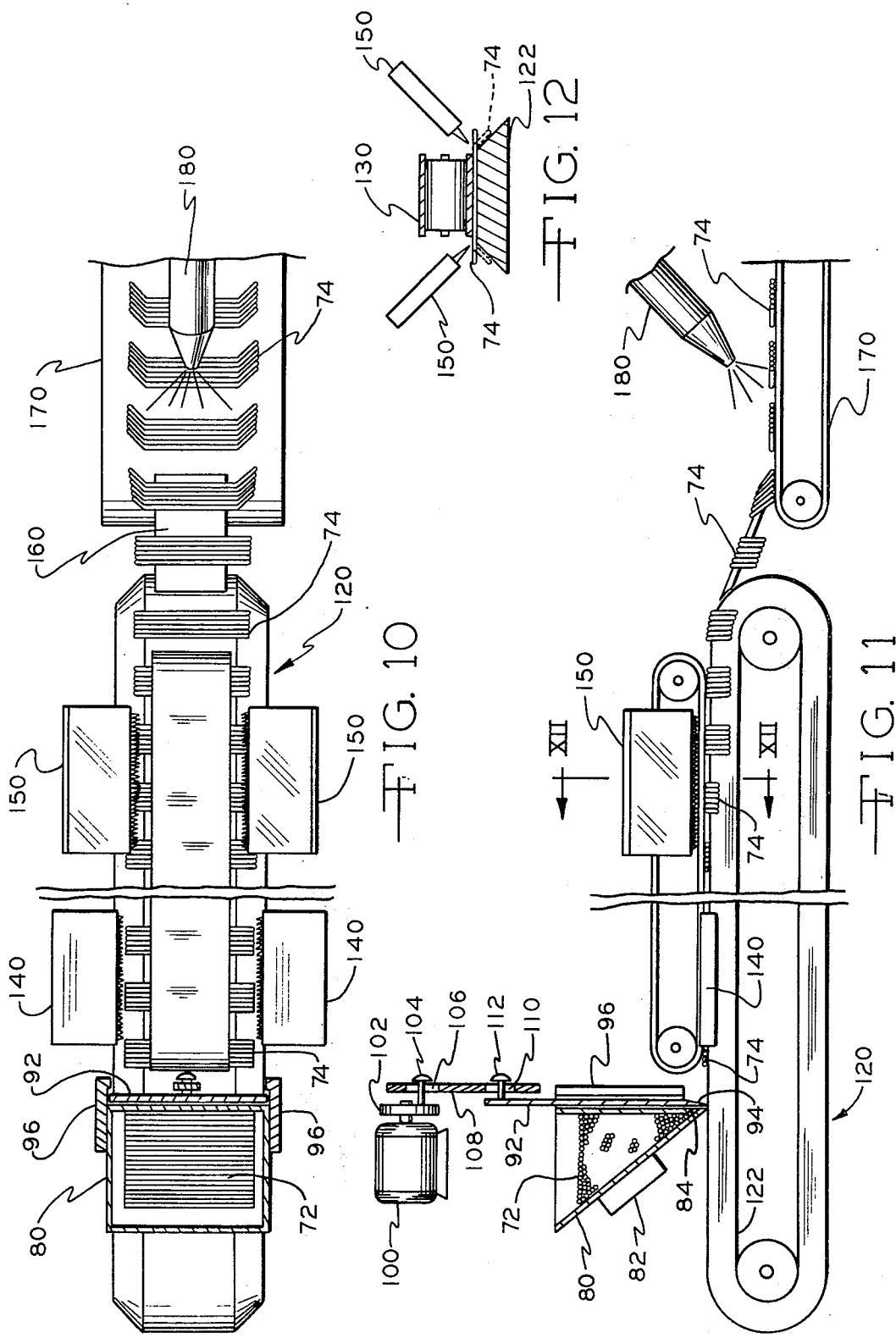

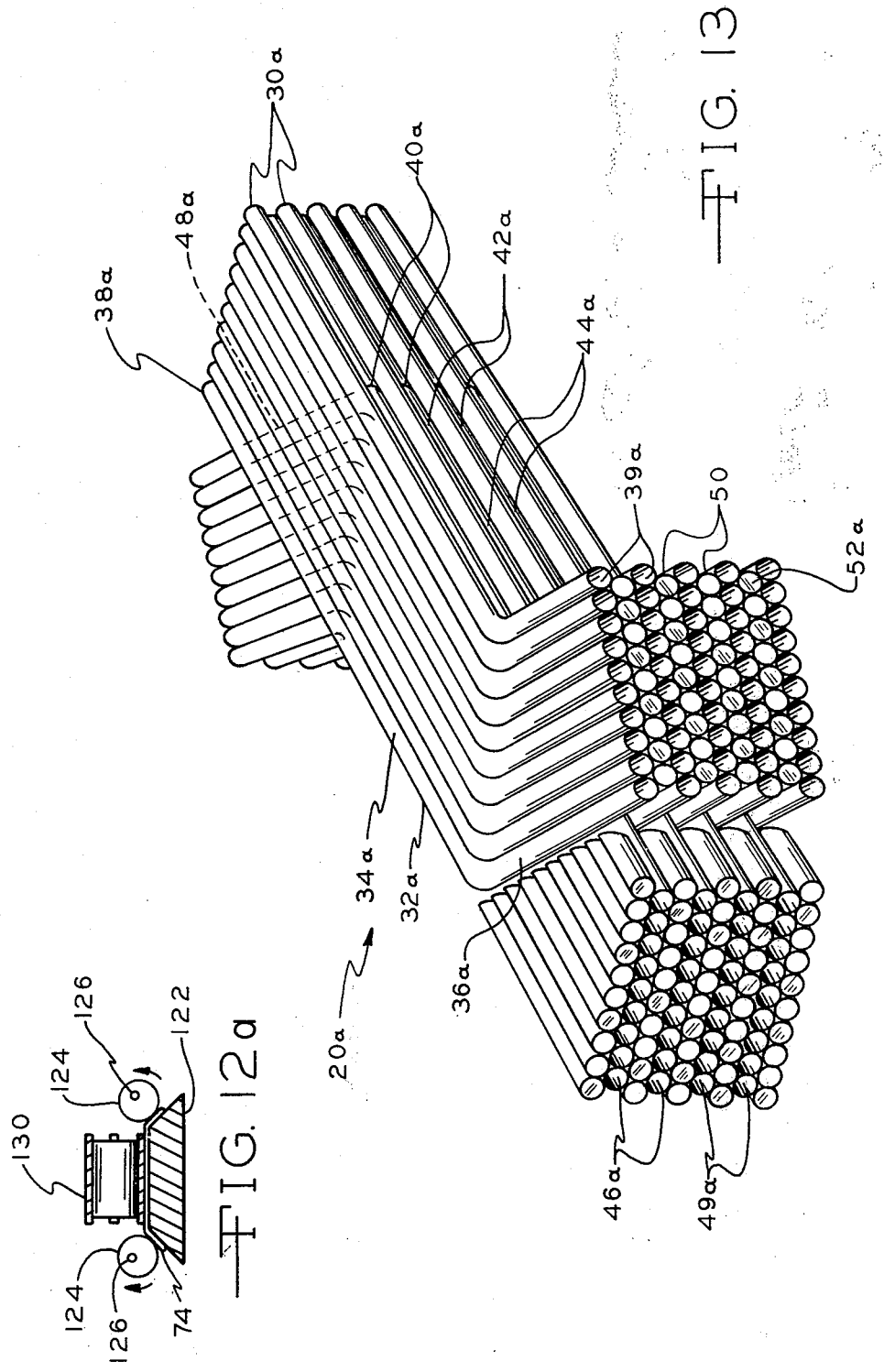

METHOD FOR MAKING A GLASS-CERAMIC RECUPERATOR

BACKGROUND OF THE INVENTION

This application is a division of my application Ser. No. 333,402, filed Feb. 16, 1973.

This invention constitutes an improvement over the structure and method disclosed in my copending patent application Ser. No. 30,859, filed in the U.S. Patent Office on Apr. 22, 1970 now abandoned and assigned to the assignee of the present invention, and an improvement over the structures and methods disclosed in the patent application of Donald F. Mold and Ronald G. Rice also copending with the present application and also assigned to the assignee of the present invention.

In the above-referenced copending application of mine, there is disclosed an assembly or matrix of integrally fused tubes useful as a compact regenerative heat exchanger, buoyancy material, sound absorption material, heat insulation material, and the like. The advantages of this type of structure and the requirements for each of the structures of this type, particularly a regenerator structure, are set forth fully in my above-referenced application and need not be repeated here.

In that application, the regenerator structure consists of a plurality of individual, axially parallel, open end glass-ceramic tubes which are thermally bonded to one another and integrated into an overall regenerator structure. Gas flow through the regenerator occurs through the individual tubes, one open end of each tube forming an inlet and the other open end of each tube forming the outlet. In a typical regenerator installation, one or both faces of the regenerator is contacted by a seal bar. The regenerator matrix is rotated relative to the seal bar which is urged against the regenerator end surface under an appreciable axial load. Because of matrix end face-seal bar contact under the sealing load, some abrasive wearing of the matrix end face will occur over an extended surface period, particularly since the matrix end face is defined by the open ends of the individual tubes. Additionally, the strength of the matrix and its ability to withstand axially or radially applied loads in operation is dependent upon the degree of integral bonding between adjacent tubes. While such matrices made in accordance with the disclosure in my copending application are capable of functioning satisfactorily as regenerators, and although improvements have been made in increasing resistance of the matrix end faces to wear, it is desirable to avoid the seal bar wear problems while retaining a high heat exchange efficiency. It is further desirable to do away with drive connections, drive power, and rotating support required by a regenerator.

In my hereinbefore referenced application, there is also disclosed a heat exchange module which is constructed by superimposing a plurality of layers of tubes, one layer above the other in successive parallel planes, with the tubes in each plane being essentially parallel to each other and transverse to the tubes in at least one of the adjacent layers. The matrix of tubes, each of the tubes having both ends sealed, is heated to soften, expand and fuse the tubes together into an integral module. The sealed ends are opened and a plurality of such modules may be assembled into a toroidally-shaped structure, each module being separated from an adjacent module by a wedge-shaped member.

In this latter module structure, the problem of seal bar wear has been removed. Although there is no movement of the module in this latter structure, it is desirable to improve the heat exchange efficiency over that provided by a crossflow relationship, while retaining the advantages of an integral low expansion glass-ceramic structure of the type described over the metal or ceramic heat exchange structures of the prior art.

A counterflow recuperator has one of the highest heat exchange efficiencies known to the prior art. However, parallel and counterflow recuperators, when made of metals such as nickle alloys, are expensive and difficult to shape and braze. Such metal recuperators often leak after repeated cycling. Recuperators have also been made of corrugated sheets of ceramic which are stacked to form a crossflow and counterflow patterns and then sintered. However, it is difficult to make the joints of these prior art recuperators and failures usually occur in the joint areas. Heat-resistant materials used in the prior art recuperator bodies are expensive and often fail in thermal fatigue, while sintered ceramic recuperators may be undesirably porous.

In the above-referenced application of Mold and Rice a parallel and counterflow recuperator structure has been disclosed which utilizes first and second pluralities of layers of tubes with the axes of the intermediate portions of the tubes in each layer essentially parallel to each other. A high heat exchange efficiency is achieved, but in the above-noted structure one of the pluralities of layers is shorter than the other of the plurality of layers so that internal header connections must be made to maintain two fluid streams separated. Such structures will operate satisfactorily and achieve good heat exchange efficiencies but may present fluid flow problems and assembly problems that are difficult to overcome in high production applications.

Accordingly, it is an object of this invention to provide a recuperator structure and a method for making same wherein the structure has superior properties and utilizes a low expansion, nonporous heat exchange body such as made from glass-ceramic materials, and which does not have the deficiencies of the previous regenerator and recuperator structures.

It is another object of this invention to provide an improved method for making a novel recuperator heat exchange assembly.

A still further object of this invention is to provide an improved apparatus, and a method for making such apparatus, for conducting fluids in heat exchange passageways which are substantially parallel to each other and which keeps the fluid streams separated, thereby maintaining a high heat efficiency while providing a structure with separated header connection areas which are easily connected to the two fluid streams between which heat is being exchanged. The structure does not require any moving parts to function properly.

SUMMARY OF THE INVENTION

The above objects are illustrated in the several embodiments of this invention herein of recuperator heat exchange assemblies. Each finished assembly includes a first plurality of layers of tubes, each tube in the plurality of layers having open ends and a portion intermediate the open ends which is essentially parallel to corresponding intermediate portions of the other tubes in the same layer and to corresponding tube portions in the other of said first plurality of layers to form a first series of longitudinally extending essentially parallel passageways for receiving a first fluid.

A second plurality of layers of tubes, each tube in the second plurality of layers having open ends and a portion intermediate the open ends which is essentially parallel to corresponding intermediate portions of the other tubes in the same layer and to corresponding intermediate tube portions in the other of the second plurality of layers, forms a second series of longitudinally extending essentially parallel passageways for receiving a second fluid.

The intermediate tube portions of each of the first plurality of layers are disposed adjacent to, essentially parallel with, and in heat exchange relationship with the intermediate tube portions of at least one of a second plurality of layers. The intermediate tube portions of each of the second plurality of layers are disposed adjacent to, essentially parallel with, and in heat exchange relationship with intermediate tube portions of at least one of the first plurality of layers. There is thus formed a stacked array of tubes having four sets of open ends for receiving and discharging first and second fluids.

The portions of the tubes in each of one of the first and second pluralities of layers between the intermediate portions thereof and a first set of the open ends thereof extend obliquely with respect to the intermediate portions thereof to position the first set of open tube ends outside of the stacked array of tubes, thereby forming a first plurality of obliquely extending tube portions having a first of said four sets of open ends outside of said stacked array and available for connection to a first header means.

Another portion of each of the tubes in each of one of the first and second pluralities of layers between the intermediate portions thereof and a second set of the open ends thereof extend obliquely with respect to the intermediate portions thereof to position the second set of open tube ends outside of the stacked array of tubes, thereby forming a second plurality of obliquely extending tube portions having a second of said four sets of open ends outside of the stacked array and available for connection to a second header means.

The remaining tube portions of the tubes in the first and second pluralities of layers between the intermediate portions thereof and the third and fourth sets of the open ends thereof extend outwardly from the intermediate portions thereof to position the third and fourth sets of open ends away from the stacked array of contiguous intermediate tube portions and away from each other to form the third and fourth sets of open ends available for connection to third and fourth header means.

Header connecting means are provided for each of the four sets of open ends for receiving the open ends of each set and for closing the spaces between and around the open ends of each set to prevent leakage of the fluids from a header means between the tube ends of each set.

The tubes and the header connecting means are constructed of material having essentially zero porosity, consisting essentially of an inorganic crystalline oxide ceramic material, and having an average coefficient of lineal thermal expansion of about $-18$ to $+50 \times 10^{-7}/°C$ over the range of $0° - 300°C$. The stacked layers of tubes and the header connecting means are fused together to form an integral assembly. While the integral assembly described hereinbefore desirably has an average coefficient of lineal thermal expansion within the range set forth above, the coefficient of lineal thermal expansion is advantageously about $-12$ to $+12 \times 10^{-7}/°C$ over the range $0° - 300°C$, and preferably has an average coefficient of lineal thermal expansion of about $-5$ to $+5 \times 10^{-7}/°C$ over the range $0° - 300°C$.

In a first embodiment disclosed herein the first plurality of tubes has obliquely extending tube portions on each end of the intermediate tube portions thereof. The second plurality of tubes in the first embodiment may have essentially straight tube portions extending from each end of the intermediate tube portions. In the first embodiment of the invention the second plurality of tubes may also have obliquely extending tube portions on each end of the intermediate tube portions.

In the embodiment illustrated first in the drawings, the oblique tube portions of the first plurality of layers both extend obliquely away from the intermediate tube portions thereof on the same side of the axes of the intermediate tube portions of the stacked array, while the oblique tube portions of the second plurality of layers both extend obliquely away from the intermediate tube portions thereof on the opposite side of the axes of the intermediate tube portions of the stacked array.

In yet another embodiment disclosed herein the first oblique tube portions of the first plurality of layers on one end of the intermediate tube portions thereof extend obliquely away on one side of the axes of the intermediate tube portions while the second oblique tube portions of the first plurality of layers on the other end of the intermediate tube portions thereof extend obliquely away on the other side of the axes of the intermediate tube portions. The first oblique tube portions of the second plurality of layers on one end of the intermediate tube portions thereof extend obliquely away from the axes of the intermediate tube portions at the same end of and in an opposite direction away from the axes as does the first oblique portion of the first plurality of layers. The second oblique tube portions of the second plurality of layers on the other end of the intermediate tube portions thereof extend obliquely away from the axes of the intermediate tube portions at the same end of and in an opposite direction away from the axes as the second oblique portion of the first plurality of layers.

In still another embodiment of the invention herein the first plurality of tubes has obliquely extending tube portions at one end of the intermediate tube portions thereof and essentially straight header connecting tube extending portions at the other end of the intermediate tube portions thereof. The second plurality of tubes has obliquely extending tube portions at one end of the intermediate tube portions thereof and essentially straight extending header connecting tube portions at the other end of the intermediate tube portions thereof. The obliquely extending tube portions of the first and second plurality of layers are disposed at opposite ends of the stacked array.

The header connecting means may comprise a foamed ceramic cement molded and heat treated in place around the tubes adjacent the open ends thereof of each of the four sets of open ends of the first and second pluralities of layers of tubes.

Each of the sets of tube ends may extend from the array in the form of a plurality of tube layers having spaces formed therebetween where the intermediate tube portions for one of the first and second layers of tubes of the stacked array space apart the intermediate tube portions of the other of the first and second layers of tubes. The header connecting means may then include a foamed ceramic cement molded and heat treated in place in the spaces between the plurality of layers of tubes and around the tubes adjacent the open ends thereof of each of the sets of open tube ends, to provide a closure around each set of open tube ends which has essentially zero porosity, has substantially the same coefficient of lineal thermal expansion as the tubes, and which fuses together with the tubes around the open ends thereof to provide an integral connecting means for a header for delivering fluid to or receiving fluid from the set of open ends.

An alternative header connecting structure for each of the sets of open tube ends may include a plurality of tightly packed individually axially elongated elements arranged with their axes parallel to each other and in layers in the spaces between the tube end layers, and sealant means interposed in the interstices between header elements, between tube ends, and between layers of header elements and tube ends to provide an integral connecting means. The sealant means may be a ceramic cement, a foamed ceramic cement, a sintered frit, or other suitable sealant which accomplishes the objectives set forth herein. Advantageously, each layer of header elements includes at least one axially elongated tube having relatively thin walls and sealed ends, each such tube having been expanded by heat treatment to compress the sealant material to insure closing the interstices between header elements and the tube end portions of the tubes in adjacent layers.

Other objects, features and advantages will become apparent from the following description when taken in conjunction with the accompanying drawings, in which:

FIG. 10 is a plan view of apparatus for preparing pluralities of layers of tubing used in making the novel recuperator structures of this invention;

FIG. 11 is a side elevational view of the apparatus illustrated in FIG. 10;

FIG. 12 is a cross-sectional view of a portion of the apparatus illustrated in FIG. 11 taken along lines XII—XII of FIG. 11;

FIG. 12a is a cross-sectional view of the apparatus shown in FIG. 12 illustrating an alternative tube bending apparatus and method;

FIG. 13 is a view in perspective of a second embodiment of the teachings of this invention;

DESCRIPTION OF THE PREFERRED EMBODIMENTS

Figure 1:
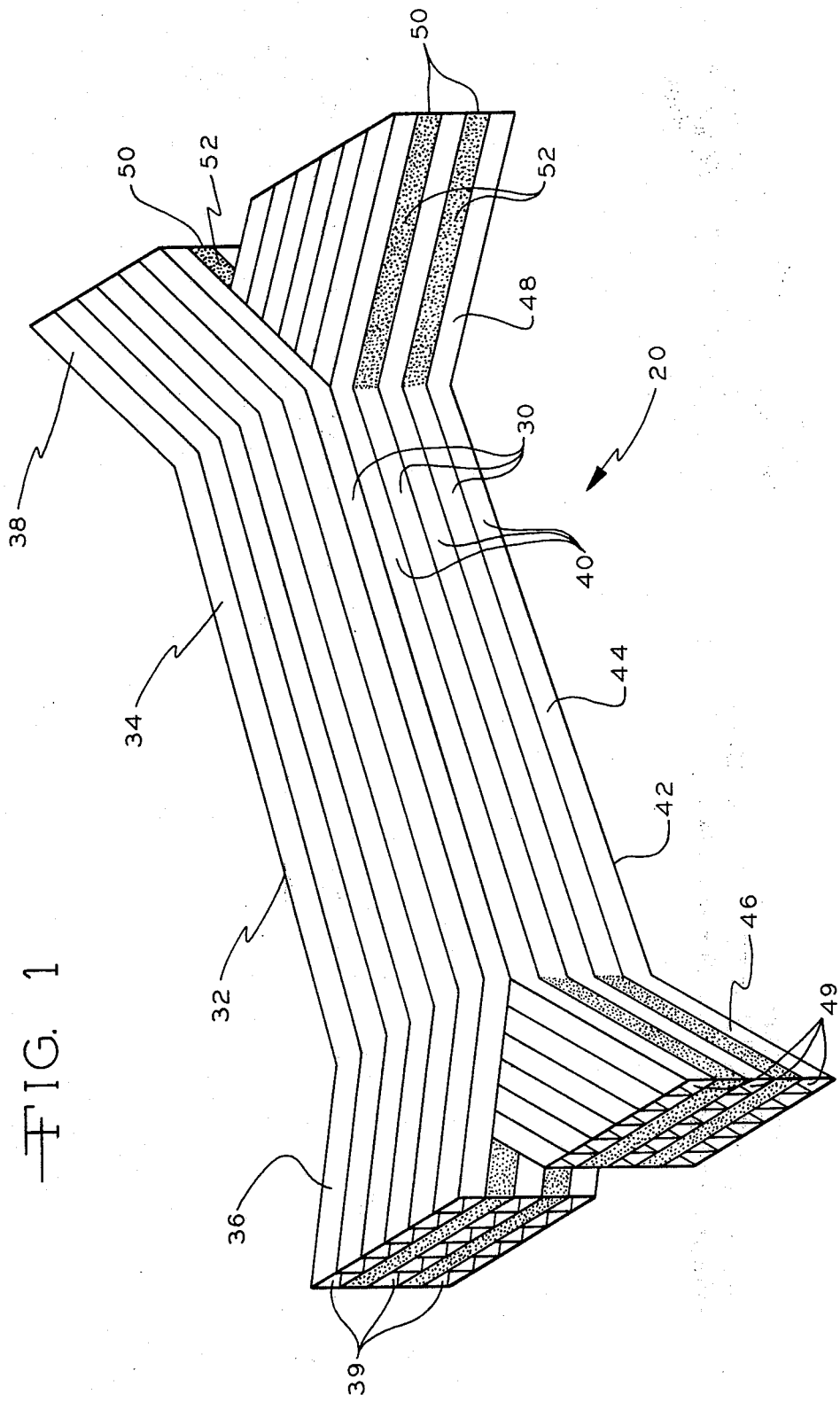
FIG. 1 is a view in perspective of an embodiment of a recuperator structure assembly illustrating the teachings of this invention.
Figure 2:
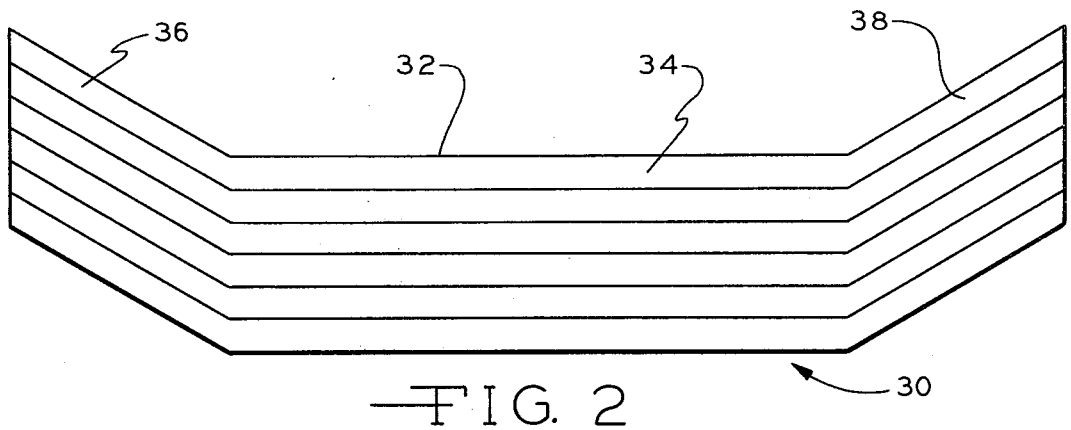
FIGS. 2 and 3 are plan views of the different types of layers of tubes utilized in the structure illustrated in FIG. 1.
Figure 3:
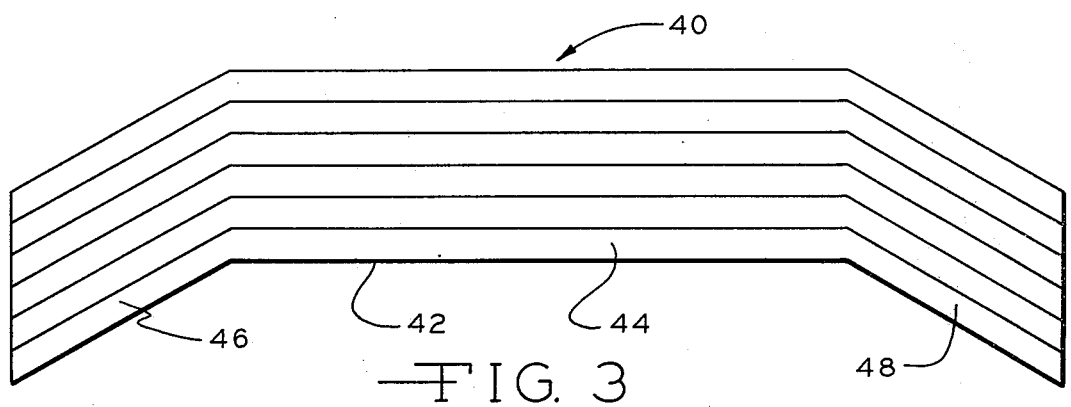

Referring to FIGS. 1 through 3, there is illustrated a recuperator heat exchange assembly 20 which embodies the teachings of this invention. The assembly 20 includes a first plurality of layers or groups 30 of tubes 32. Each tube 32 in the plurality of layers 30 has open ends 39 and a portion 34 intermediate the open ends 39 which is essentially parallel to corresponding intermediate portions 34 of the other tubes 32 in the same layer and corresponding intermediate tube portions 34 in the other of the first plurality of layers 30 to form a first series of longitudinally extending essentially parallel passageways for receiving a first fluid.

A second plurality of layers or groups 40 of tubes 42 are interposed between the first plurality of layers of tubes 30. Each tube 42 in the second plurality of layers 40 has open ends 49 and a portion 44 intermediate the open ends 49 which is essentially parallel to corresponding intermediate portions 44 of the other tubes 42 in the same layer and the corresponding intermediate tube portions 44 in the other of the second plurality of layers 40 to form a second series of longitudinally extending essentially parallel passageways for receiving a second fluid.

The intermediate tube portions 34 of each of the first plurality of layer 30 are disposed adjacent to, essentially parallel with, and in heat exchange relationship with the intermediate tube portions 44 of at least one of the second plurality of layers 40. The intermediate tube portions 44 of each of the second plurality of layers are disposed adjacent to, essentially parallel with, and in heat exchange relationship with the intermediate tube portions 34 of at least one of the first plurality of layers 30. There is thus formed a stacked array of tubes which has four sets of open ends for receiving and discharging first and second fluids.

The portions 36 of the tubes in each of one of the first and second plurality of layers (such as layer 30) between the intermediate portions thereof 34 and a first set of the open ends 39 thereof, extend obliquely with respect to the intermediate portions 34 thereof to position the first set of open tube ends 39 outside of the stacked array of tubes, thereby forming a first plurality of obliquely extending tube portions having a first of the four sets of open ends outside of the stacked array and available for connection to a first header means.

Another portion 38 of each of the tubes 32 in each of one of the first and second pluralities of layers (in this instance the layers 30) between the intermediate portions 34 thereof and a second set of the open ends 39 thereof, extends obliquely with respect to the intermediate portions 34 thereof to position the second set of open tube ends outside of the stacked array of tubes, thereby forming a second plurality of obliquely extending tube portions 38 having a second of the four sets of open ends outside of the stacked array and available for connection to a second header means.

The remaining tube portions 46, 48 of the tubes 42 in the first and second pluralities of layers (in this instance the plurality of layers 40) between the intermediate portions 44 thereof and the third and fourth sets of open ends 49 extend outwardly from the intermediate portions 44 to position the third and fourth sets of open ends 49 away from the stacked array of contiguous intermediate tube portions 34, 44 and away from each other and the other sets of open ends to form the third and fourth sets of open ends available for connection to third and fourth header means.

In the embodiment illustrated in FIG. 1 the oblique tube portions 36, 38 of the first plurality of layers 30 both extend obliquely away from the intermediate tube portions 34 thereof on the same side of the axes of the intermediate tube portions 34, 44 of the stacked array, while the oblique tube portions 46, 48 of the second plurality of layers 40 both extend obliquely away from the intermediate tube portions 44 thereof on the opposite side of the axes of the intermediate tube portions 34, 44 of the stacked array.

Each of the sets of oblique tube end portions extend from the array in the form of a plurality of tube layers having spaces 50 formed therebetween where the intermediate tube portions of one of the first and second layers 30, 40 of tubes 32, 42 of the stacked array space apart the intermediate tube portions 34, 44 of the other of the first and second layers of tubes 30, 40.

Header connecting means 52 are provided for the assembly in FIG. 1 and in this embodiment includes a foamed ceramic cement molded and heat treated in place in the spaces 50 between the plurality of layers of tubes and around the tubes adjacent the open ends 39, 49 thereof each of the sets of open tube ends, to provide a closure around each set of open tube ends which has essentially zero porosity, has substantially the same coefficient of lineal thermal expansion as the tubes, and fuses together with the tubes around the open ends thereof to provide an integral connecting means for a header for delivering fluid to or receiving fluid from the set of open ends.

Although not shown herein, it is to be understood that additional layers of tubes or glass rods may be utilized on the outside surfaces of the assembly 20 of FIG. 1 to provide insulation and protective skins for the assembly. Such insulation and protective skins of rods and tubes are fully disclosed in the copending application of Mold and Rice which is referenced hereinbefore.

The tubes 32, 42 and the header connecting means 52 are formed from material having essentially zero porosity, consisting essentially of an inorganic crystalline oxide ceramic material, and having an average coefficient of lineal thermal expansion of about $-18$ to $+50 \times 10^{-7}/°C$ over the range of $0° - 300°C$. The stacked layers of tubes 32, 42 and the header connecting means 52 are fused together to form an integral assembly as illustrated at 20.

As noted above, while the assembly desirably has an average coefficient of lineal thermal expansion within the range just set forth, the coefficient of lineal thermal expansion is advantageously about $-12$ to $+12 \times 10^{-7}/°C$ over the range $0° - 300°C$, and preferably has an average coefficient of lineal thermal expansion of about $-5$ to $+5 \times 10^{-7}/°C$ over the range of $0° - 300°C$.

A ceramic cement and foamable ceramic cement suitable for use in manufacturing the assembly of FIG. 1 and the structures illustrated hereinafter is disclosed in U.S. Pat. No. 3,189,512, issued June 15, 1965, and in U.S. Pat. No. 3,634,111, issued Jan. 11, 1972. Usually round thermally crystallizable tubing is used in forming the structure of the invention, the drawing of round glass tubing to controlled dimensions being an old established art in the industry.

Referring to FIGS. 4 through 11 there is illustrated apparatus for and a method of making the assemblies illustrated herein. Referring first to FIGS. 10, 11, and 12 there is illustrated apparatus for forming the layers of tubes to be utilized. To facilitate the assembly of the tubes 72 in FIGS. 10 through 12 so that the layers may be superimposed one upon another, a plurality of straight tubes 72 with open ends which have been pre-cut to a specified length are fed into a hopper 80 by means not shown. The hopper 80 may be continuously vibrated by means of a vibrator 82 in contact therewith, so that the tubes are maintained in parallel relationship and are deposited individually through the hopper opening 84 at the base of the hopper 80 onto a forming conveyor 120 disposed directly beneath the opening 84 and continuously moving in a direction away from the hopper 80.

A tube dispensing mechanism is indicated generally at 90 and is utilized to periodically permit the exit from the hopper opening 84 of a predetermined number of tubes 72 in succession to form separate layers 74. The mechanism 90 includes a hopper gate 92 having a sharp bottom edge 94 which enables separation of successively issuing tubes. The sharp bottom edge may be made of hard rubber or other suitable material which will not damage the tubes as they are separated as each group exits from the hopper opening 84. The hopper gate 92 is mounted to be reciprocated vertically in gate slides 96. A motor 100 rotates a reciprocating wheel 102 which has a wheel stud 104 offset from the center thereof. The wheel stud 104 extends through a slot 106 formed in a connector bar 108. The connector bar 108 extends downwardly to the hopper gate 92 and has a second connector bar slot 110 formed therethrough. A gate slide stud 112 extends from the gate 92 through the slot 110.

In operation, as the motor 100 rotates the wheel 102, the stud 104 is raised and lowered with respect to the connector bar 108 and the gate slide 92. The slots 106 and 110 are formed in the connector bar 108 so that the relative reciprocation of the studs 104, 112 enables the lifting of the gate 92 for a predetermined interval and the lowering of the gate for a second predetermined interval. A predetermined number of tubes 72 may exit from the hopper 80 after the gate is raised and before the gate is again lowered to provide separation of the issuing tubes 72 into layers 74 on the conveyor 120. The rate of movement of the conveyor 120 and the rate of deposit of the tubes 72 thereon are adjusted so that the tubes 72 are deposited and maintained in parallel, contacting relationship with adjacent tubes in each layer 74. As the conveyor 120 and each layer 74 moves away from the hopper 80 an overhead conveyor 130 contacts the layers 74 and holds them together and firmly on the conveyor 120 to retain the layers 74 in place while operations are performed thereon.

As the layers 74 move away from the hopper 80 the ends of the tubes 72 in each layer pass through flames from oppositely disposed ribbon burners 140 mounted on either side of the conveyor belt 120. The flames of the burners 140 fuse and close the tubes to trap air within the tubes. The flames from the burners 140 are directed so they do not adversely affect any other portion of the tube 72 in the layer 74, but only impinge on the tube ends.

As the layers 74 of tubes continue along the conveyor 120, a second set of ribbon burners 150 is directed downwardly at an angle toward the ends of the intermediate or central straight parallel portions of the tubes 72. As the layers 74 pass by the ribbon burners 150 the glass tubes receive heat at the desired point of bending. As the glass in each tube softens, the weight of the cantilevered portion of the tubing 72 bends the tubing to a desired angle as provided by the trapezoidal cross-section of the belt 122 of the conveyor 120. This is illustrated in FIG. 12 wherein the solid line configuration of the layer 74 represents the layer as it is entering the area between the oppositely disposed burners 150, while the dotted line portion of the layers 74 indicates the obliquely extending position that the tube end portions have assumed in response to having the portion at the ends of the central parallel parts of the tube softened by the heat from the burners 150.

It has been found that under certain circumstances the method of tube bending does not always function satisfactorily. That is, for certain tube diameters, glass compositions, and the weight and lengths of tube portions that are cantilevered, the tube portions will either not bend in response to gravitational forces and/or the heat applied to obtain a gravitational bend may be excessive and cause a sealing of or a reduced size in the internal passageway of a tube at the bend.

Therefore, alternative bending method and apparatus are illustrated in FIG. 12a. Although the ribbon burners 150 are not shown in FIG. 12a, it is assumed that the tube layers 74 have already passed beneath the burners 150 and have received enough heat at the bending areas of the tubes to soften the bending areas.

The layers 74 then pass below a pair of oppositely disposed bending cam means 124. The cam means 124 are cam wheels rotatably driven on offset shafts 126. The speed of rotation of the cams 124 is such that the tube engaging portions of the cams 124 are rotated out of the way to allow the straight ends of the tubes of a layer 74 to be moved into position between the oppositely disposed cams 124. The cams 124 then rotate in the direction of the arrows to move downwardly into contact with the cantilevered portion of the tube ends of the layers 74 and bend the heated tubes to the position shown in FIG. 12a.

It is obvious that the conveyor flight 122 and/or the cams 124 may be indexable or have continuous movement to produce the desired results. The apparatus illustrated in FIG. 12a may be positioned between the burners 150 and the end of the upper flight 122 of the conveyor 120.

After the tube ends are bent to the desired angle the layers 74 are discharged from the conveyor 120 down a guide slide plate 160. The width of the plate 160 may be such so that the intermediate or central portions of the tubes 72 are retained in alignment. As each layer of tubes reaches a flattening or layer-shaping conveyor 170, the downwardly depending tube ends contact the upper flight of the conveyor 170 and are moved forwardly with respect to the intermediate tube portions thereof so that the tube layers assume the configuration illustrated in FIG. 10 on conveyor 170.

A thin layer of air-setting bonding material may be sprayed on the upper surface of the layers 74 on the conveyor 170 by means of a nozzle 180 of a spray gun, which material bends the tubes together so that the layers of tube become rigid enough to be handled like a thin sheet of plastic material. For example, a urethane compound such as Spraylat No. 6210 may be used.

Figure 4:
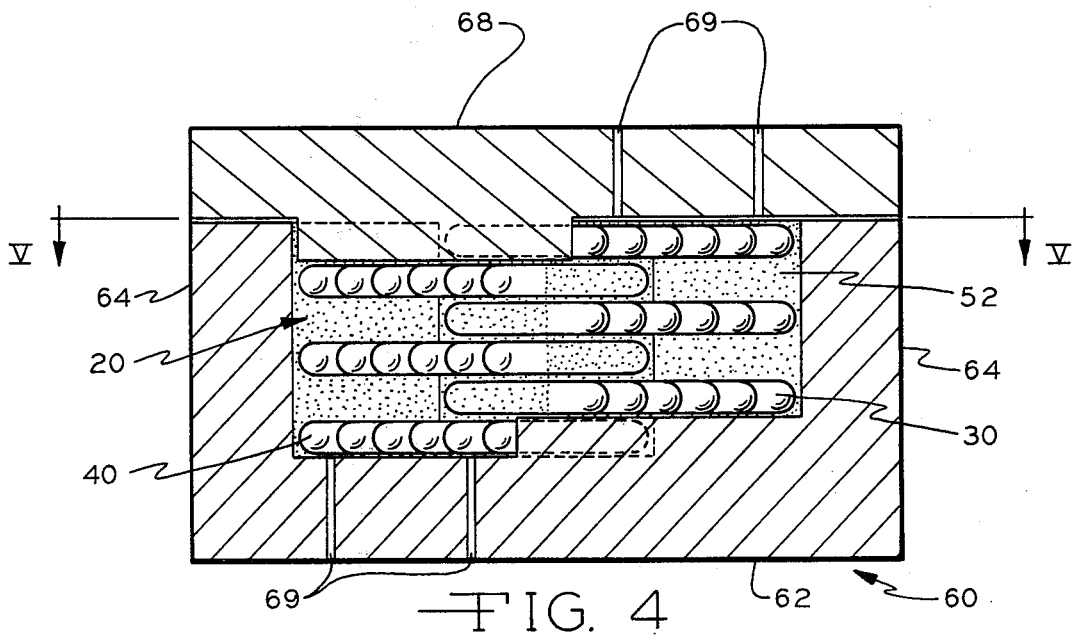
FIG. 4 is a cross-sectional view of the assembly illustrated in FIG. 1 placed in a mold for heat treatment.
Figure 5:
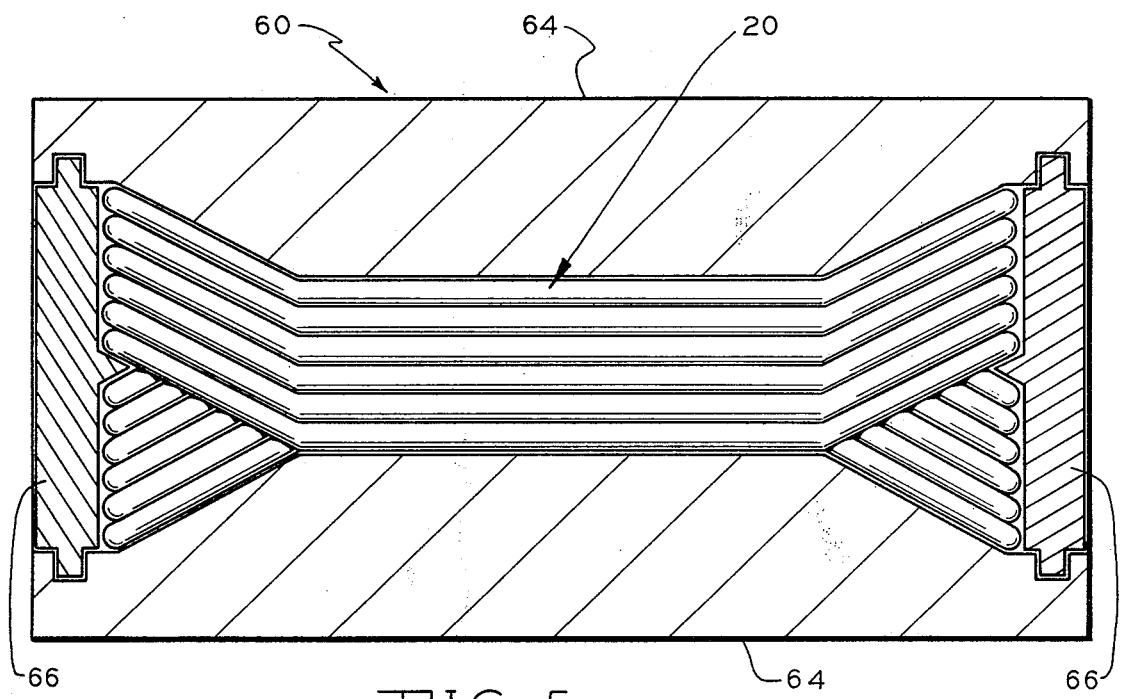
FIG. 5 is a cross-sectional view of the apparatus illustrated in FIG. 4 taken along lines V—V of FIG. 4.

Referring now to FIGS. 4 and 5 there is illustrated a constraining mold indicated generally at 60. The mold 60 includes a bottom wall portion 62, side walls 64, end walls 66, and a heavy top cover wall 68. Perforations 60 may be formed in the top cover 68 and the bottom wall 62 to permit the escape of gas from between the interstices of the tubing as the assembly is heat treated.

The layers of tubing 74 as produced by the apparatus illustrated in FIGS. 10 through 12 may be utilized to form the assembly 20 illustrated in FIG. 1 by stacking a first layer 74 in the mold 60, then an inverted layer 74, and proceeding in this manner to provide the first and second plurality of layers 30, 40. The tubes in the layers are tightly packed in the mold 60 and the spaces 50 filled with a foamable ceramic cement material 52 as described hereinbefore. The end walls 66 may then be put into place and the top cover 68 placed on top of the assembly 20. The outer surfaces of the assembly 20 are then constrained or restricted against movement in a direction outwardly from the assembly.

The mold 60 with the assembly therein is then placed in a furnace and subjected to a heat sufficient to soften the glass walls of the sealed end tubes to cause the walls of sealed end tubes to bloat or expand in response to the heating of the expansible fluid medium in each tube so that adjoining contacting wall surfaces within the layers and between the layers are fused together and so that the foamable ceramic cement material 52 is activated to completely fill the interstices between the tubes between the spaces 50 and around the ends of the tuoes to form a unitary assembly 20. As the individual tubes expand, the air or other gases in the interstices may exit through the perforations 69 which are formed in the restraining top and bottom walls 68, 62 of the mold 60.

Figure 6:
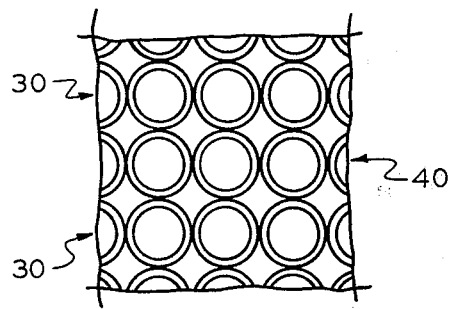
FIG. 6 is a cross-sectional view of a portion of the intermediate tube portions of a first embodiment of this invention before heat treatment.
Figure 7:
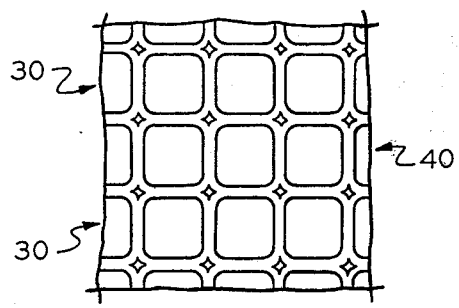
FIG. 7 is a cross-sectional view of the sections illustrated in FIG. 6 showing the expansion of the tube after heat treatment.

The heating of the thin-walled sealed end tubes expands them into close contact with each other, and into the interstices between the tubes and between the layers of the sealed end tubes to a greater or lesser extent, ideally to an extent to substantially fill the interstices. Referring to FIGS. 6 and 7 a cross-sectional view of the intermediate portions of the tube layers 30 and 40 is illustrated in which the axes of each intermediate tube portion in each layer each lie in a plane formed by the lines of contact between adjacent tubes. That is, the tubes are directly one above the other.

Referring to FIG. 7 there is illustrated a cross-section of the portion illustrated in FIG. 6, after heat treatment, in which the tube walls have been expanded to substantially fill the interstices. In this instance the resulting bloated tubes become essentially square or rectangular in cross-section.

The glass tubes are fusing to each other and with the foamable ceramic material 52 and are also undergoing nucleation during the heat treatment, and heating of the assembly is continued for a time sufficient to in situ crystallize the glass to an at least partially crystalline material, commonly referred to as a glass-ceramic.

After the assembly has been crystallized, and usually after cooling to room temperature, the assembly 20 may be removed from the mold 60 and the tube ends removed by grinding, by diamond saw, or other suitable methods to obtain the opened ends 39, 49 as illustrated in FIG. 1.

Well suited for use in the methods of this invention are thermally crystallizable glasses that are convertible by heating to glass-ceramic bodies. As used herein, a glass-ceramic is an organic, essentially crystalline oxide ceramic material derived from an amorphous inorganic glass by in situ bulk thermal crystallization.

Prior to thermal in situ bulk crystallization, thermally crystallizable glasses can be drawn into tubing using conventional glass-forming techniques and equipment. Similarly, the thermally crystallizable glasses may be made into various ceramic cements suitable for use as the material 52 and as disclosed in the U.S. Pat. Nos. 3,189,512 and 3,634,111 referenced hereinbefore.

After being assembled in the manner shown in FIGS. 4 and 5, the thermally crystallizable glass tubes and ceramic cement material are subjected to a controlled heat treatment until the sealed end tubes have been expanded, the foamable ceramic cement activated, the assembly portions have been fusion sealed to each other and crystallization of the entire structure has been effected.

Thermally crystallizable glass compositions and the glass-ceramics resulting from thermal in situ crystallization thereof which are useful in the method and product of this invention are those which have, in the crystallized state, a coefficient of thermal expansion in the range of from $-18$ to $+50 \times 10^{-7}/°C$ over the range $0° - 300°C$ and preferably as low as $-12$ to $+12$, or $-5$ to $+5$, $\times 10^{-7}/°C$ over the range $0° - 300°C$. The compositions usually used are those containing lithia, alumina, and silica, together with one or more nucleating agents including $TiO_2$, $ZrO_2$, $SnO_2$ or other known nucleating agents. In general, such compositions containing in weight percent about 55 to 75 $SiO_2$, about 15 to 25 $Al_2O_3$ and about 2 to 6 $Li_2O$, together with about 1.5 to 4 weight percent of nucleating agents selected from one or more of $TiO_2$, $ZrO_2$ and $SnO_2$, can be employed. Preferably, not more than about 2.5 weight percent $TiO_2$ is usually used or the crystallization is undesirably rapid to be compatable with the fullest expansion of the tubes in the bloating process.

Other ingredients can be present in small amounts, as is understood in the art, such as even as much as 4 or 5 weight percent ZnO, up to as much as 3 or 4 weight percent CaO, up to as much as 8 percent MgO, and up to as much as 5 percent BaO, as long as the silica plus alumina plus lithia and the nucleating agent(s) are at least about 85, usually 90, weight percent of the total glass and the glass composition will thermally crystallize to a glass-ceramic having the desired low expansion coefficient set forth hereinbefore. Exemplary compositions which can be used in the process of the invention include those compositions disclosed in U.S. Pat. No. 3,380,818; those compositions disclosed in U.S. Ser. No. 464,147 filed June 15, 1965, now abandoned; and corresponding British Pat. Nos. 1,124,001 and 1,124,002 dated Dec. 9, 1968; and also those compositions disclosed in U.S. application Ser. No. 866,168 filed Oct. 13, 1969, which issued as Pat. No. 3,625,718 on Dec. 7, 1971, and corresponding Netherlands Printed Patent Application 6805259; and also those compositions set forth in U.S. application Ser. No. 146,664 filed May 25, 1971, now abandoned.

In any event, the thermally crystallizable glass tubing, glass rods if used as discussed hereinafter, and the sealent materials in the lithia-alumina-silica field containing nucleating agents as before described, are assembled as previously set forth and the constrained assembly of sealed tubing (containing the heat-expansible fluid) and the header connecting and sealing material 52 are heated at any suitable rate that will not thermally shock the assembly up to a temperature range in the maximum nucleating range of the glass. The maximum nucleation range can be determined for all such glasses by the general method outlined in the above-referenced U.S. Pat. No. 3,380,818, beginning at Column 9, line 54.

For the process of the present invention, where expansion and fusion are to be effected or initiated while nucleation is occurring, it is preferred that the assembled tubes be heated in the range of 50°F to 250°F above the annealing point for a period of one hour or more. This time can be extended to 10 or 20 hours, and even longer times are not harmful. During this time of heating in such temperature range, nucleation is effected as well as fusion aided by pressure exerted by expansion of the trapped fluid in the sealed end tubes. Thereafter, the temperature is raised to a higher temperature than the first heating range, which higher temperature is at least 200°F above the annealing point temperature or may be as high as the final crystallization temperature (usually 1800° to 2300°F). The final crystallization can be effected at any such temperature range higher than the nucleation-expansion-fusion temperature (50° to 250°F above the annealing point temperature) and can be as low as 200°F above the annealing point or as high as 2300°F or as high as the upper liquidus temperature.

In this second stage of heating further expansion and the beginning of crystallization is effected, followed by the completion of crystallization on continued heating to a degree such that the assembly has an average coefficient of expansion in the range set forth hereinbefore.

While the temperature may be raised directly to the final crystallization temperature range at a suitable furnace heating rate, usually in the range of 10° to 300°F per hour, it is usually preferred to allow crystallization to be effected slowly while further expansion of the sealed end tubes and the fusion of sealed end tubes and rods, if used, and the header connecting material is being effected by having an intermediate step between the first nucleation-and-fusion temperature range and the final crystallization temperature, which range is usually about 200°F to about 700°F usually from 200° to 500°F, above the annealing point of the original glass. Exemplary holding times in this intermediate range are from 1 to 8 hours, after which the assembly is heated up to the final crystallization temperature, usually in the range from about 1800° to 2300°F.

Obviously, no specific heat treatment instructions can be given suitable for all thermally crystallizable glass compositions. As is well-known, glass-ceramics do not have adequate strength if they are not sufficiently nucleated before crystals are allowed to grow appreciable in size, so that routine experiments known to those skilled in the art are used to determine what length of time is best to obtain an adequate number of crystallization centers or nuclei in the glass in the nucleation temperature range of 50° to 250°F above the annealing point.

Another point that must be kept in mind is that, if it is an object to obtain appreciable expansion beyond that necessary to get good fusion between the tubes, in other words to get appreciable reshaping of the sealed end tubes to fill the interstices between tubing, one should not raise the temperature too slowly when going from a nucleation temperature range to the intermediate range, since a rigid crystalline network may begin to set in and to prevent further expansion. It is found that some compositions can be heated at a rate as low as 10° to 50°F per hour to this intermediate temperature range and still get sufficient expansion of the tubing. On the other hand, some compositions have been found not to fully expand unless the heating rate from the initial nucleation-fusion temperature range to the intermediate temperature range is used, sometimes on the order of at least 200°F to 300°F per hour or higher.

The length of time of heating in the final crystallization temperature range of 1800°F to about 2300°F is from ½ hour to 5 or 6 hours, although longer times normally are in no way deleterious. After the crystallization has been completed, the structure can be cooled at furnace rate or, dependent upon its expansion characteristics, in air because the structure is of such low expansion that thermal shock will not harm it.

After the heat treatment just described, the product can now be cooled and the sealed ends of the tubes in the layers 30 and 40 cut or ground away to open each tube to atmospheric pressure. Alternatively, if the intermediate step of crystallization heat treating at a temperature range of 200° to 700°F above the annealing point temperature is used, the heat treatment can be interrupted after this intermediate step and cooled somewhat or even cooled to room temperature, and the ends of the tubes in the layers 30, 40 cut or ground away and opened to atmospheric pressure. Then the assembly can be heated up again into the final crystallization heat treatment range, where further and final crystallization is effected.

Referring now to FIG. 13, there is illustrated a second embodiment of the teachings of this invention in which an assembly generally indicated at 20a, again has first and second pluralities of layers of tubes 30a, 40a stacked on top of each other. In this instance the intermediate or central tube portions 34a, 44a of the tubes 32a, 42a are again essentially straight, essentially parallel to the other central tube portions in the same layer and to the central tube portions in the other layers. However, the header connecting tube portions are formed somewhat differently. In the layers 30a the header connecting tube portions 36a extend obliquely with respect to the axes of the intermediate tube portions 34a, 44a so that the first set of open ends 39a are disposed or offset to one side of the assembly 20a. The other header connecting tube portions 38a of the tubes 32a, however, extend directly straight and outwardly from the ends of the stacked array of intermediate portions 34a, 44a until the open ends 39a thereof are separated from the rest of the body or assembly.

Correspondingly, the header connected tube portions 48a of the layers 40a extend obliquely with respect to the axes of the intermediate tube portions 34a and 44a so that the tube openings 49a are offset to the side and away from the tube openings 39a of the header connector tube portions 38a. The other header connector tube portions 46a of the layers 40a are extended straight out from the ends of the stacked array of intermediate tube portions 34a, 44a for a distance sufficient to place the open ends 49a past and away from the set of open ends 39a of the header connector tube portions 46a.

Thus, the first plurality of tubes 30a has obliquely extending tube portions 36a at one end of the intermediate tube portions 34a thereof and essentially straight extending tube portions 38a at the other end intermediate tube portions 34a thereof. The second plurality of tubes 42a has obliquely extending tube portions 48a at one end of the intermediate tube portions 44a thereof and essentially straight extending tube portions 46a at the other end of the intermediate tube portions 44a thereof. The obliquely extending tube portions 36a and 48a of the first and second plurality of layers 30a, 40a are disposed at opposite ends of the stacked array.

Thus, four sets of open ends are again provided in separated positions for easily connecting header means thereto for directing two separate fluid streams into the intermediate portions 34a, 44a to obtain a heat exchange therebetween.

Figure 14:
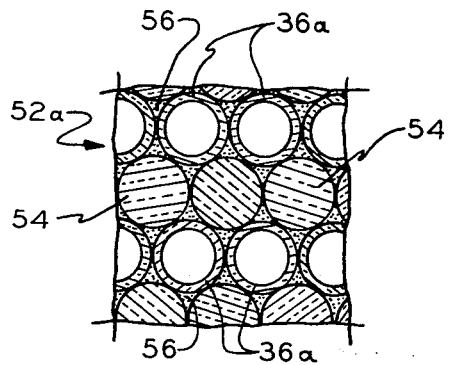
FIG. 14 is a schematic representation of a portion of the assembly illustrated in FIG. 13.

An alternative embodiment of header connecting means 52a is illustrated in the spaces 50a formed between the extending header connector tube portion layers of the assembly 20a in FIG. 13. As best shown in FIG. 14, the header connecting means 52a may comprise a plurality of tightly packed individually axially elongated elements 54 arranged with their axes parallel to each other and disposed in layers between the header connecting tube portion layers, such as 36a. Sealant material 56 is interposed between the adjacent elements 54 and between the tube layers 36a (or 38a, 46a, 48a) and around the header connector tube portions and header connector elements to join the elements into an integral mass which is nonporous and prevents a fluid from a header connecting means from flowing between the interstices of the header connecting tube portions. The sealant material 56 may be a ceramic cement or a foamable ceramic cement such as described in the hereinbefore referenced U.S. Pat. Nos. 3,189,512 and 3,634,111. The sealant material 56 may also be a sinterable frit, the use and disposition of a sinterable frit material to close interstices between tubes or rods being disclosed in the copending application Ser. No. 169,216, filed Aug. 5, 1971, by Marion I. Gray, Jr. now U.S. Pat. No. 3,773,484, issued Nov. 20, 1973. and assigned to the same assignee as the assignee of the present invention.

In a manner fully described in the above-referenced application Ser. No. 169,216, each of the glass rods, or of the glass tubes to be described hereinafter, utilized in the manufacture of the header connecting means 52a receives a coating of a sinterable thermally crystallizable frit. The entire exterior surfaces of these tubes or rods are preferably coated with a frit composition identified in the above-referenced application Ser. No. 169,216, the composition preferably being of the same thermally crystallizable glass composition of which the tubes and rods are formed.

Figure 15:
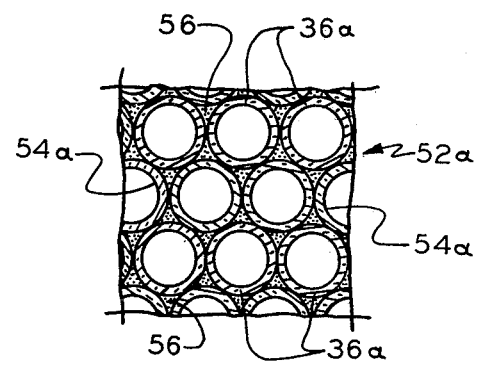
FIG. 15 is a schematic representation of an alternate embodiment for the apparatus illustrated in FIG. 13.

It is advantageous to include at least one individually axially elongated tube with sealed ends and expansible fluid medium entrapped therein in the layers of the header connecting material 52a. It is most advantageous, if a sinterable frit sealant material 56 is being utilized, to utilize sealed glass tubes as shown at 54a in FIG. 15 for the entire layers of header connecting means 52a. Thus, during the heat treating of the assembly 20a and during the bloating or expanding of the tubes 32a, 42a and of the tubes in the header connecting means 52a and the fusion of the tube wall surfaces, and interspersed rods if utilized, into the unitary assembly, the finely divided frit will sinter and distribute itself in the interstices between the tube walls (and between the tube walls and rods if utilized) to aid in securing and fusing the walls and/or rods to one another.

The frit interposed in the interstices between the expanding tubes may be subjected to substantial pressures generated by the expansion of the sealed end tubing walls. The resultant sintering, melting, and distribution of the frit will adhere to expanded tube walls to one another and to its own sintered glass-ceramic mass to join the assembly 20a into an integral unit and seal the spaces between and around the ends of the tubes of the header connecting portions of the layers 30a, 40a to prevent leakage of fluids from a header which is attached to the header connecting tube portion assemblies.

There have thus been described a recuperator heat exchange assembly which comprises a plurality of layers of tubes having central tube portions superimposed one above the other in successive parallel planes to form a stacked array. The central portions of the tubes within each plane are essentially parallel to each other and to central tube portions in the other planes. The central tube portions of part of the layers form a first series of longitudinal passageways while the remaining central tube portions in the rest of the layers form a second series of longitudinal passageways. Each layer of first series passageways are in heat exchange relationship with at least one layer of the second series passageways. Each layer of tubes has header connector tube portions continuing outwardly from each end of each central tube portion and away from the stacked array. The header connecting tube portions have open ends for supplying fluid to and receiving fluid from the central tube portions.

The header connector tube portions of the first series of passageways diverge from the header connector tube portions of the second series of passageways at each end of the central tube portions in the array, to separate the sets of open tube ends thereof from each other to enable connection of a separate header to each of the resulting four sets of open tube ends. In the embodiment illustrated in FIG. 13 the header connecting tube portions 36a and 48a diverge away from the axes of the stacked array of intermediate tube portions, while the header connecting tube portions 38a and 46a extend straight out from the stacked array of intermediate tube portions. However, there is a relative divergence between the tube portions 46a, 36a and between the tube portions 38a and 48a, even though the tube portions 46a and 38a are straight with respect to the axes of the intermediate tube portions 34a, 44a. Thus, the header connector tube portions will be described as diverging with respect to each other, whether they are aligned with or oblique to the central tube portions.

Header connecting means are provided for receiving each of the four sets of open tube ends, for supporting the tube ends and for closing the spaces between and around the open ends to prevent fluid leakage from the header between the header connecting tube portions.

The header connecting means illustrated in FIG. 13 includes a plurality of tightly packed individually axially elongated elements, either tubes or rods or a mixture thereof, arranged with their axes parallel with each other and in layers in the spaces between the header connector tube portion layers. As shown in FIG. 13 the axes of the header connector elements are also parallel with the axes of the header connector tube portions of the layers 30a and 40a. However, it is to be understood, that the axes of the header connector elements may be arranged transverse to the header connector tube portions if the proper composition and the proper amount of sealant is interposed in the interstices between the header elements and the header connector tube portions. Sealant means is interposed in the interstices between the header connector elements, and between layers of header connector elements and layers of header connector tube portions, to provide a nonporous integral header connecting means in conjunction with the header elements.

Figure 8:
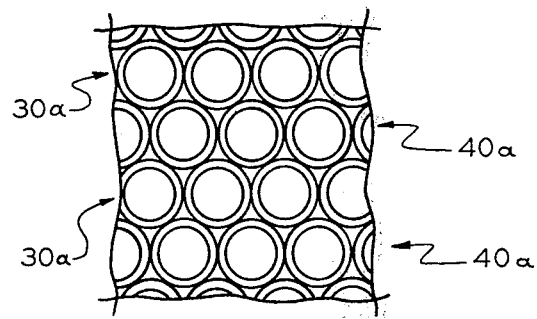
FIG. 8 is a cross-sectional view of the intermediate tube portions of a second embodiment of the teachings of this invention taken before heat treatment of the assembly.
Figure 9:
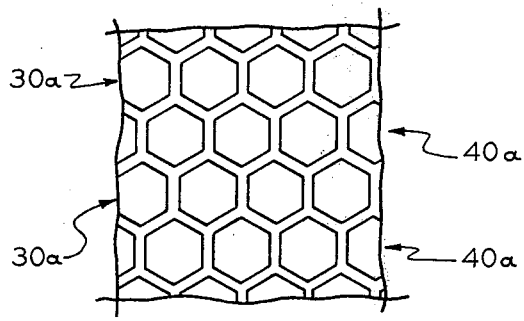
FIG. 9 is a cross-sectional view of the section illustrated in FIG. 8 taken after heat treatment has been applied thereto.

In the embodiment illustrated in FIG. 13 the axes of the intermediate or central tube portions 34a, 44a of each layer are aligned between the axes of the intermediate tube portions of adjacent layers as illustrated in FIG. 8. Thus when the tubes are expanded the interstices between the tubes are more substantially filled or are substantially filled, depending upon the amount of expansion during heat treatment, and will result in the substantially hexagonal cross-sectional areas as illustrated in FIG. 9 when the heat treatment is completed. The substantially hexagonal configuration of FIG. 9 provides the most effective heat transfer efficiency.

Figure 16:
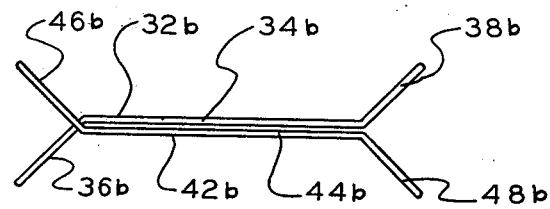
FIGS. 16, 17, and 18 schematically illustrate third, fourth, and fifth alternate embodiments of the teachings of this invention.

Referring now to FIGS. 16 through 19 there are illustrated alternative embodiments in a schematic form for building a structure, with separated sets of open tube ends for connection to external headers, according to the teachings of this invention. In FIG. 16 the tube 32b has an essentially straight central portion 34b and a header connector tube portion 36b extending obliquely downwardly, while a header connection tube portion 38b extends upwardly. A tube 42b has a central tube portion 44b disposed in heat relationship with the central or intermediate tube portion 34b and has a header connector tube portion 46b extending upwardly, while the header connection tube portion 48b extends obliquely downwardly.

Figure 17:
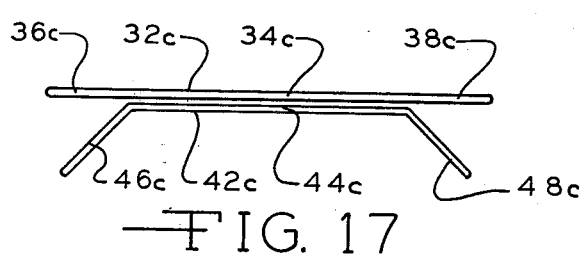

In FIG. 17 the tube 32c has an intermediate portion 34c which is substantially straight while the header connector tube portions 36c and 38c extend straight outwardly from the intermediate tube portion 34c. The tube 42c has a substantially straight central portion 44c while the header connecting tube portions 46c and 48c are diverged away from the tube portions 36c, 38c and obliquely away from the axes of both of the intermediate tube portions 44c, 34c.

Figure 18:
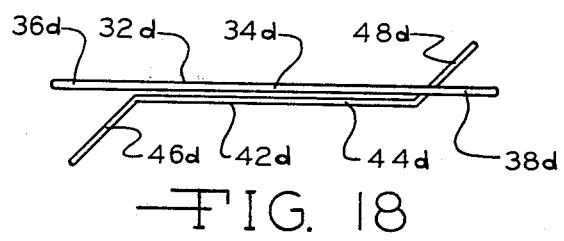

In FIG. 18 the tube 32d has a straight intermediate portion 34d and again has straight header connector portion tubes 36d, 38d extending outwardly from the ends of the intermediate portion 34d. The tube 42d has a straight intermediate tube portion 44d, while the header connector tube portion 46d extends obliquely away from the intermediate portion 44d in one direction and the header connector tube portion 48d extends away from the intermediate tube portion 44d in the other direction, to again separate the tube ends into the four sets desired.

In describing the various embodiments of the invention therein there has been disclosed a novel method for making the novel recuperator heat exchange assemblies which includes forming a multiplicity of elongated tubes of a glass that is thermally crystallizable to a low expansion glass-ceramic. Each of the tubes have an essentially straight central or intermediate portion and header connector portions continuing from each end of the central tube portion thereof. Each tube is filled with a fluid medium that is expansible in response to the application of heat and the ends of the tubes are sealed to retain the expansible fluid medium therein. The juncture of the header connector tube portions and the central tube portions are heated and the header connector tube portions of at least part of the multiplicity of tubes are bent with respect to the central tube portions, so that first and second groups of tubes are formed in which the header connector portions of the two groups diverge from each other when the central tube portions of tubes from each group are placed side by side or are stacked one above the other.

The tubes of the first and second groups are arranged into pluralities of layers with the central tube portions in each layer essentially parallel to each other. The plurality of layers of tubes are superimposed one above the other in successive parallel planes with the central tube portions of each layer essentially parallel to the central tube portion of adjacent layers and with the layers of central tube portions arranged next to each other in a stacked array. Each layer of central tube portions of the first group are disposed in heat exchange relationship with the layer of central tube portions of the second group. The plurality of layers are arranged so that the header connector tube portions of the two groups diverge from each other at each end of the stacked array of central tube portions to provide four sets of separated header connector tube portion ends.

The spaces between and around the ends of each of the four sets of separated header connector tube portions are filled with a header connecting material that is thermally crystallizable to a low expansion glass-ceramic having substantially the same coefficient of lineal thermal expansion as the elongated tubes. The outer surfaces of the assembly of the layers of tubes and header connector material are constrained to restrict outward movement of the assembly.

The constrained assembly is subjected to a heat treatment which includes temperatures sufficient to soften the elongated tubes and to cause the fluid medium therein to expand to urge the tubes into contact with the adjacent tubes and the header connecting material to fuse the assembly portions into an integral mass. The heat treatment further includes temperatures sufficient to effect crystallization of the tubes and the header connector material into a low expansion glass-ceramic. The sealed ends of the tubes are then opened to enable reception and discharge of fluids therethrough for heat exchange therebetween.

The thermally crystallizable tubes have a wall thickness sufficient to permit substantially complete expansion of the stacked array of central tube portions by the fluid medium therein during the heat treatment of the assembly. The central tube portions of one layer may be arranged with their axes in vertical planes extending through the lines of contact with tubes above and below, the tubes expanding to have a substantially square or rectangular cross-section. The central tube portions of one layer may also have their axes aligned between the axes of the corresponding tube portions in adjacent layers, the tubes then expanding to have a substantially hexagonal cross-section which substantially fills all of the interstices between the central tube portions.

There has thus been described novel heat exchange structures utilizing counterflow techniques to obtain the most efficient heat exchange, which have no moving parts, and which have external header connections to aid in assembly of the structures to systems and which provide reduced turbulence in fluid flow through the structures.

There has also been described herein novel apparatus for making the tubular component layers of the novel heat exchange assembly.

A conveying means, which may include more than one conveyor as shown in FIGS. 10 and 11, is provided for receiving layers of tubular components and moving the layers through successive operation stations.

Means are provided for periodically depositing a plurality of elongated tubes, in contiguous relationship with each other on the conveying means, to form spaced pluralities of layers of tubes. Each of the tubes is deposited so that a central portion is supported by the conveying means while at least one header connector portion extends outwardly from the supported central tube portion in a cantilevered arrangement with respect to the conveying means.

A tube forming station is provided which includes means for heating each tube at the junction of the central portion and at least one of the header connector portions. Means are also provided at the forming station for bending the heated tube to dispose the header connector portion at a predetermined angle with respect to the central tube portion. The bending means may include a conveyor edge portion formed to receive and retain the bend of the header connector tube portion at the desired angle as the force of gravity pulls the cantilevered header connector portion down on the conveyor edge portion. The conveyor edge portion is formed at angle with respect to the horizontal portion of the upper flight of the conveyor.

Alternatively, for certain applications the tube bending means may also include means for mechanically engaging the header connector tube portions, after the tube junctions have been heat softened, and moving the header connecting tube portions to form the required predetermined angle with the central tube portions.

Finally, means are provided for adhering or binding the tubes together in a layer to form an integral unit that may be easily handled.

The elongated tubes may be provided with their ends already sealed. However, if open-end tubes are deposited on the conveyor a tube sealing station is provided which may include heating means for softening and sealing the open ends.

The apparatus also advantageously includes an aligning station located intermediate the tube forming and tube layer binding stations for moving the bent header connector tube portions of a layer into a planar relationship with respect to the central tube portions, with the header connector tube portions all extending in the same direction. In the embodiment disclosed herein the header connector tube portions are engaged by a second conveyor, as the layer moves along a guide ramp or slide, to move the header connector tube portions up into a plane defined by the central tube portions.

An overhead conveyor arrangement may be utilized to cooperate with the layer conveying means to hold the tube layers in place while various operations are performed on the tube layers.

While there have been shown and described and pointed out the fundamental novel features of the invention with reference to the preferred embodiments thereof, those skilled in the art will recognize that various changes, substitutions, omissions and modifications in the methods and structures described may be made by those skilled in the art without departing from the spirit of the invention.

I claim:

1. A method for making a recuperator heat exchange assembly, comprising
   a. forming a multiplicity of elongated tubes of a glass that is thermally crystallizable to a low expansion glass-ceramic having a coefficient of lineal thermal expansion of about $-18$ to $+50 \times 10^{-7}/°C$ over the range of $0° - 300°C$, each of said tubes having an essentially straight central portion and header connector portions continuing from each end of the central tube portion thereof;
   b. filling each tube with a fluid medium that is expansible in response to the application of heat, and sealing the ends of the tubes to retain the expansible fluid medium therein;
   c. heating and bending the header connector tube portions with respect to the central tube portions of at least part of the multiplicity of tubes so that first and second groups of tubes are formed in which the header connector portions of the two groups diverge from each other when the central tube portions of tubes from each group are placed side by side;
   d. arranging tubes of said first and second groups into pluralities of layers with the central tube portions in each layer essentially parallel to each other;
   e. superimposing pluralities of layers of tubes one above the other in successive parallel planes with the central tube portions of each layer essentially parallel to the central tube portions of adjacent layers and with the layers of central tube portions arranged next to each other in a stacked array, each layer of the central tube portions of the first group being disposed in heat exchange relationship with a layer of central tube portions of the second group, said plurality of layers being arranged so that the header connector tube portions of the two groups diverge from each other at each end of the stacked array of central tube portions to provide four sets of separated header connector tube portion ends;
   f. filling the spaces between and around the ends of each of the four sets of separated header connector tube portion ends with header connecting material that is thermally crystallizable to a low expansion glass-ceramic having substantially the same coefficient of lineal thermal expansion as said elongated tubes;
   g. constraining the outer surfaces of the assembly of the layers of tubes and header connecting material to restrict outward movement of the assembly; and
   h. subjecting said constrained assembly to a heat treatment which includes temperatures sufficient to soften said elongated tubes and to cause said fluid medium therein to expand to urge the tubes into contact with adjacent tubes and said header connecting material to fuse said assembly portions into an integral mass, and which further includes temperatures sufficient to effect crystallization of said tubes and said header connecting material into a low expansion glass-ceramic.

2. A method as defined in claim 1 wherein the average coefficient of lineal thermal expansion of said thermally crystallized tubes is about $-12$ to $+12 \times 10^{-7}/°C$ over the range of $0° - 300°C$.

3. A method as defined in claim 1 wherein the average coefficient of lineal thermal expansion of said thermally crystallized tubes is about $-5$ to $+5 \times 10^{-7}/°C$ over the range of $0° - 300°C$.

4. A method as defined in claim 1 which further includes opening the sealed ends of said tubes to enable reception and discharge of fluids therethrough for heat exchange therebetween.

5. A method as defined in claim 1 in which said space filling step includes interposing a foamable ceramic cement between and around each set of header connector tube portions adjacent the ends thereof.

6. A method as defined in claim 1 in which said layers of tubes are arranged so that each set of header connector tube portions for one of said first and second groups of tubes extend from the stacked array as a plurality of tube layers spaced apart by the central tube portions of the other of said first and second groups of tubes.

7. A method as defined in claim 6 in which the space filling step includes molding a foamable ceramic cement mixture in place between the plurality of layers of each set of header connector portion tubes and around the header connector tube portions adjacent the ends thereof to provide a closure and support for each set of header connector tube portions which has substantially the same coefficient of lineal thermal expansion as said tubes, and is fused together and to the tubes to form a seal having essentially zero porosity.

8. A method as defined in claim 6 in which said space filling step includes
   a. tightly packing a plurality of individually axially elongated elements arranged with their axes parallel to each other and in layers in the spaces between the header connector tube portion layers; and
   b. interposing a sealant material in the interstices between said space filler elements, between header connector tube portions, and between layers of space filler elements and layers of header connector tube portions to provide a nonporous integral header connection.

9. A method as defined in claim 8 in which said space filling step further includes arranging the axially elongated space filling elements with their axes parallel to the header connector tube portions and providing such space filling elements with a length so that they extend from the ends of the header connector tube portions back to the stacked array to provide structural strength.

10. A method as defined in claim 8 in which said sealant material is a ceramic cement.

11. A method as defined in claim 8 in which said sealant material is a foamable ceramic cement.

12. A method as defined in claim 8 in which said sealant material is a sinterable frit.

13. A method as defined in claim 8 in which said space filling step further includes disposed at least one axially elongated tube in each layer of space filling elements with each such tube having relatively thin walls, sealed ends and an expansible fluid medium entrapped therein, each such tube being softened and expanded by said heat treatment to compress said sealant material into the interstices and to urge each layer of tightly packed spacing elements together to aid in closing interstices and form a nonporous seal between and around tubes and elements.

14. A method as defined in claim 1 wherein the thermally crystallizable tubes have a wall thickness sufficient to permit substantially complete expansion of the stacked array of central tube portions by the fluid medium therein during the heat treatment of said assembly.

15. A method as defined in claim 14 wherein the central tube portions of one layer are arranged with their axes in vertical planes extending through the lines of contact with tubes above and below, said tubes expanding to have a substantially rectangular cross-section.

16. A method as defined in claim 14 wherein the central tube portions of one layer have their axes aligned between the axes of the corresponding tube portions in adjacent layers, said tubes expanding to have a substantially hexagonal cross section which substantially fills all of the interstices between said central tube portions.

17. A method for making a recuperator heat exchange assembly, comprising
 a. providing first and second pluralities of layers of elongated tubes formed of a glass that is thermally crystallizable to a low expansion glass-ceramic having a coefficient of lineal thermal expansion of about $-18$ to $+50 \times 10^{-7}/°C$ over the range of $0° - 300°C$, each of said tubes being filled with a fluid medium that is expansible in response to the application of heat and having sealed ends to retain said expansible fluid medium entrapped therein;
 b. each of said tubes having an essentially straight central portion and header connector portions continuing from each end of the central tube portion to the sealed ends of the tube, the header connector tube portions of said first plurality of layers diverging away from the header connector tube portions of said second plurality of layers at the ends of said central tube portions when one of said layers is placed on top of the other of said layers;
 c. stacking the central tube portions of said first and second pluralities of layers one above the other with the axes thereof all essentially parallel and with the central tube portions of each first plurality layer in heat exchange relationship with the central tube portions of a second plurality layer, the header connector tube portions at each end of said central tube portions of each layer being arranged so that the connector tube portions of said first layers diverge from the connector tube portions of the second layers to provide four sets of separated header connector tube portion ends, each set of header connector tube portion ends for one of said first and second pluralities of layers extending from the stacked array of tubes as a plurality of tube layers spaced apart by the central tube portions of the other of said first and second pluralities of layers;
 d. filling the spaces between the layers and around the tubes adjacent the ends thereof of each set of header connector tube portions with a header connecting material that is thermally crystallizable to a low expansion glass-ceramic having substantially the same coefficient of lineal thermal expansion as said tubes to seal each set against fluid flow between the tubes;
 e. constraining the outer surfaces of the assembly of tube layers and header connecting material to prevent outward movement of the assembly; and
 f. heat treating the constrained assembly to soften the elongated tubes and enable the fluid medium therein to expand and urge the tubes into contact with adjacent tubes and said header connecting material to fuse said assembly into an integral mass, and to effect crystallization of said tubes and header connecting material into a low expansion glass-ceramic.

* * * * *